United States Patent [19]

Wright

[11] Patent Number: 4,595,803

[45] Date of Patent: Jun. 17, 1986

[54] BIDIRECTIONAL AMPLIFIER

[75] Inventor: James T. Wright, Cedarcrest, N. Mex.

[73] Assignee: The United States of America as represented by the United States Department of Energy, Washington, D.C.

[21] Appl. No.: 576,500

[22] Filed: Feb. 2, 1984

[51] Int. Cl.[4] .................. H04B 1/58; H04M 1/20
[52] U.S. Cl. ................... 179/170.6; 179/170 NC; 179/81 B; 370/32
[58] Field of Search .......... 179/170 R, 81 R, 170 NC, 179/81 A, 81 B, 170.6, 170.2; 370/29, 32

[56] References Cited

U.S. PATENT DOCUMENTS

| | | | |
|---|---|---|---|
| 3,480,742 | 11/1969 | Gaunt, Jr. .................. | 179/170 NC |
| 3,833,772 | 9/1974 | Getgen ..................... | 179/170 NC |
| 3,944,743 | 3/1976 | Crigler et al. .............. | 179/81 A |
| 4,356,354 | 10/1982 | Ferrieu .................... | 179/16 AA |
| 4,357,495 | 2/1981 | Sweet et al. ............... | 179/77 |

OTHER PUBLICATIONS

"Engineers Notebook, A Handbook of Integrated Circuit Applications", Forest M. Mims III, Radio Shack, 1979, p. 103.

Primary Examiner—Gene Z. Rubinson
Assistant Examiner—R. Vaas
Attorney, Agent, or Firm—George H. Libman; Albert Sopp; Judson R. Hightower

[57] ABSTRACT

A bilateral circuit is operable for transmitting signals in two directions without generation of ringing due to feedback caused by the insertion of the circuit. The circuit may include gain for each of the signals to provide a bidirectional amplifier. The signals are passed through two separate paths, with a unidirectional amplifier in each path. A controlled sampling device is provided in each path for sampling the two signals. Any feedback loop between the two signals is disrupted by providing a phase displacement between the control signals for the two sampling devices.

16 Claims, 5 Drawing Figures

BIDIRECTIONAL AMPLIFIER

The United States government has rights in this invention pursuant to Contract No. DE-AC04-76DP00789 between the United States Department of Energy and Western Electric Company.

TECHNICAL FIELD

This invention relates to a method and apparatus for bidirectional amplification of signals, and more particularly to a circuit for amplifying and passing signals in two paths between two line pairs with provision for avoiding introduction of feedback and ringing due to connections between a receiver and transmitter at one of the line pairs.

BACKGROUND ART

In the art of telecommunication, it is known to transfer signals, with or without amplification, between two line pairs. For example, a typical voice frequency repeater used in telephone networks is described in Freeman, *Telecommunication Transmission Handbook*, John Wiley & Sons, New York 1975 at Section 2.10. The repeater, shown in FIG. 2.13 therein, utilizes two unidirectional amplifiers in a four line circuit which, through the use of a pair of hybrid transformers, is connected via two lines to each of two stations.

Other illustrations of bidirectional amplifiers are found in the patent art. For example, U.S. Pat. No. 4,282,407 to Stiefel discloses a telephone loop resistance detector which utilizes a bidirectional amplifier 22. The bidirectional amplifier, shown in FIG. 2, includes a pair of unidirectional differential amplifiers 50 and 51 interconnected in a feedback arrangement for passing signals from tip and ring lines 52 and 54 to and from tip and ring lines 53 and 54, ring line 54 being common to the two line pairs. Positive feedback circuits 59, 60 and 62, 63 are used to subtract each signal from a composite signal. However, the impedance used in the feedback network is frequency sensitive, thus suggesting that the amount of feedback varies with frequency. No provision is made for complete elimination of receiver-transmitter feedback. The disclosed circuit provides a switchable gain.

A further illustration of a bidirectional amplifier is provided in U.S. Pat. No. 3,519,765 to Huber, wherein a single transistor 14 is used to amplify signals in both directions between two signal sending and receiving devices. A control switch 12 is used to reverse the bias voltage applied to the transistor in order to operate the transistor 14 in one or the other of the two modes of amplification. The transistor is constantly connected between both sending and receiving devices, thus permitting feedback between the transmitted and received signals.

Still another reference of interest is the Chambers, Jr. U.S. Pat. No. 3,573,402 wherein a bidirectional amplifier additively combines a power source with a signal source in one of two directions, depending on the direction of current in the signal loop. A controlled amount of boost voltage is added in a power aiding relationship to an input signal source, without provision for elimination of feedback between the two signal sources. The disclosed circuit requires sensing circuitry to determine the direction of flow of signal current in order to switch the polarity of connection of the power source to the circuitry. A circuit responsive to net current in the source-load loop is utilized towards that end.

In each of these prior art circuits there is provided a direct connection between the two line pairs and thus between the paths provided for the signals being transmitted bidirectionally through the disclosed circuitry. Thus, prior art circuitry typically leads to generation of feedback signals since a signal generated at a transmitter of a first station and placed on the lines is also provided to the receiver of the first station, as well as to the destination second station. Thus, where it is desired to add to, or extract from a signal, passing through a transmission line such as a telephone line by means of a connection to a microphone and speaker, for example, and where a bidirectional amplifier of the type disclosed in the prior art is used to connect the telephone line and loudspeaker, ringing and feedback will develop when the microphone and speaker are in close proximity.

There is thus a need in the prior art to provide apparatus and method for bidirectionally connecting a signal source to a receiver and transmitter station without generation of any ringing or feedback due to the connection itself.

DISCLOSURE OF THE INVENTION

Accordingly, it is a primary object of the present invention to overcome the difficulties of the prior art and to provide method and apparatus for connecting a first signal source to a second signal source having a transmitter and receiver while preventing generation of ringing due to the connection.

It is a more specific object of the invention to provide a bidirectional circuit having a feedback avoiding means which includes a phased modulating network for modulating signals passing in opposite directions at noncoincident times.

It is a further object of the invention to provide a bidirectional amplifier utilizing first and second switchable gates for passing first and second signals in two directions and including a switching signal generator for providing switching signals to the switchable gate means for turning the gates on and off in a predetermined phase relationship selected for reducing interaction between the two signals.

It is an additional object of the invention to provide a bidirectional amplifier utilizing a pair of controllable analog switches for sampling signals in two directions at nonoverlapping times.

It is another object of the invention to provide a bidirectional amplifier having adjustable gain for the two directions of signal transmission.

Yet another object of the invention is the provision of a bidirectional circuit having two signal paths, each path including a controlled gate and an amplifier, and further including a control circuit for providing control signals for the controlled gates in order to modulate the signals passing through the first and second paths at alternating times.

Additional objects, advantages and other novel features of the invention will be set forth in part in the description which follows and in part will become apparent to those skilled in the art upon examination of the following, or may be learned with the practice of the invention. The objects and advantages may be realized and attained by means of the instrumentalities and combinations particularly pointed out in the claims.

To achieve the foregoing and other objects, and in accordance with the purposes of the present invention as described herein, a bidirectional circuit is provided for passing first and second signals from a first source to a destination and from a second source back to the first source, respectively, including a circuit for preventing the introduction of feedback between the first and second signals in the bidirectional circuit. The circuit for avoiding introduction of feedback preferably includes a pair of switches for periodically modulating the first and second signals at noncoincident times. The resulting periodic signals are preferably noncoincident and are thus incapable of introducing feedback between the destination and second source into the signal levels. Preferably, the switches operate at a frequency selected to provide an accurate representation of the signal in accordance with a known criterion.

In accordance with another aspect of the invention, there is provided a bidirectional amplifier which includes first and second switchable gates connected to the first and second source circuits for receiving the first and second signals, and further connected to the destination and first source circuits to provide the signals thereto. A switching signal generator provides first and second switching signals to the switchable gates. The signals are used to turn the switchable gates on and off in a predetermined phase relationship selected to reduce interaction between the first and second signals. An oscillator may be used to provide the switching signals periodically and at substantially opposite phases to the switchable gates. The switchable gates may be formed as analog switches.

Additionally, first and second amplifiers may be connected to the first and second switchable gates to provide first and second gains to the signals. Gain controllers may be provided for each of the amplifiers, thereby to vary the gains separately or together. Filters may be provided to reduce any sampling noise generated by the first and second switching signals. Additionally, isolation buffers may be provided to the inputs of any of the switchable gates to isolate the same from the corresponding source circuits.

The invention may be utilized with a single transducer, so that the destination circuit and the second source circuit may represent substantially a single circuit.

In accordance with yet a further aspect of the invention there is provided a bidirectional circuit having a pair of signal paths, each path including an amplifier and a controlled gate. A control circuit is included for providing periodic control signals for the controlled gates of the two paths in order to control passage and blockage of the signals through the paths. The control circuit preferably includes structure for assuring that the two control signals are provided to the controlled gates at phases which are substantially separated by 180° from one another. The bidirectional circuit may be connected to a telephone transmission line as one of the signal sources therefor. The remaining connections to the circuit may be a transmitter and receiver of a device, such as a public address system, connected to the telephone network.

Still other objects and features of the present invention will become readily apparent to those skilled in this art from the following description wherein there is shown and described a preferred embodiment of the invention, simply by way of illustration of one of the best modes suited to carry out the invention. As will be realized, the invention is capable of still other, different embodiments and its several details are capable of modification in various obvious aspects, all without departing from the invention. Accordingly, the drawing and descriptions will be regarded as illustrative in nature and not as restrictive.

BRIEF DESCRIPTION OF THE DRAWINGS

The accompanying drawings, incorporated in and forming a part of the specification, illustrate several aspects of the present invention and, together with the description, serve to explain the principles of the invention. In the drawings.

Reference will now be made in detail to the present preferred embodiment of the invention, as illustrated by the accompanying drawing.

DETAILED DESCRIPTION OF THE INVENTION

Figure 1:
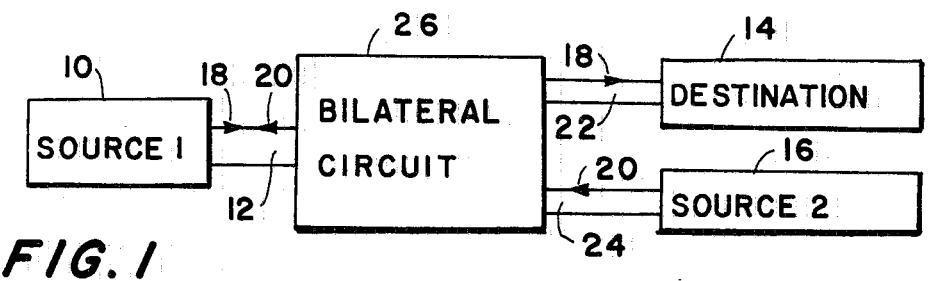
FIGS. 1 and 2 show two illustrative uses to which a bidirectional amplifier of the present invention may be applied.

Referring now to FIG. 1, there is shown a configuration wherein a first source 10 is in two way communication over a line pair 12 with a destination circuit 14 and a second source 16. The destination 14 may comprise a receiver and the second source 16 may comprise a transmitter of a telephone set, for example. Alternatively, the destination and second source may be a loudspeaker and microphone of a public address system. Other environments where the structure of FIG. 1 arises may include a data transmission configuration in which the first source 1 both transmits and receives data to and from a utilization circuit provided at destination 14 and a second data source provided in second source 16.

As is evident by the arrowheads associated with the line pairs connecting the various circuits, first source 10 transmits a first signal 18 and receives a second signal 20 on line pair 12. The circuit 14 receives the first signal 18 on a line pair 22 while second source 16 transmits the signal 20 on a line pair 24 associated therewith. A bidirectional circuit 26 is used to interconnect the various circuits, and optionally to provide amplification for signals passing therebetween.

Figure 2:
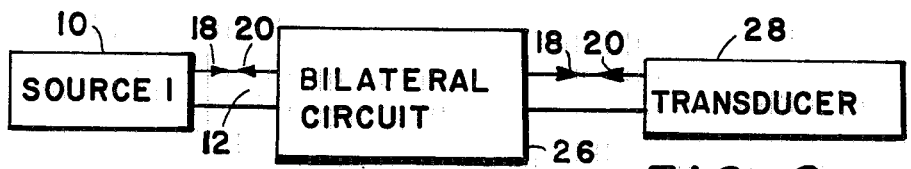

The three port environment shown in FIG. 1 may be modified by combining the destination circuit 14 together with the second source 16 in a combined transducer 28 used in a two port configuration as shown in FIG. 2.

While various bidirectional circuits or amplifiers are available in the prior art as previously described, the present invention provides an amplifier usable in the configurations of FIGS. 1 and 2 for avoiding the introduction of ringing or similar distortion due to feedback or other interactions between the destination and second source circuits 14 and 16 which otherwise arise in the prior art.

Figure 3:
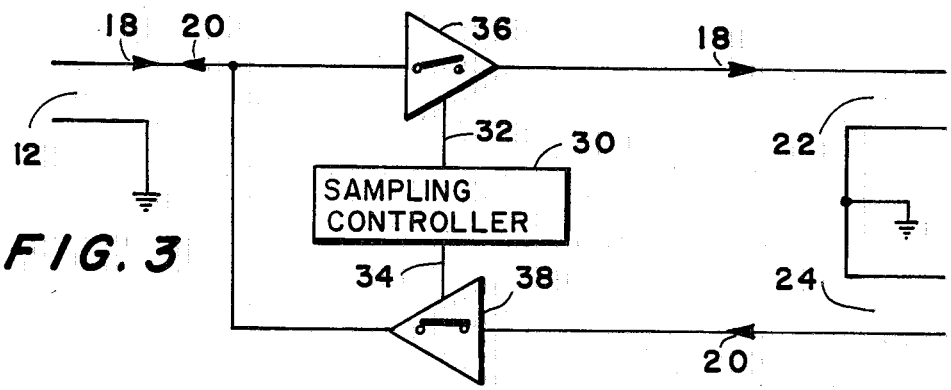
FIG. 3 shows a block diagram representation of the invention in its broadest form.

In its broadest form, the present invention may be represented by the diagram shown in FIG. 3 to replace the bidirectional circuit 26 of FIGS. 1 and 2. Therein, a modulating controller 30 generates first and second phase displaced modulating signals on lines 32 and 34 for activating and deactivating first and second modulating devices 36 and 38. As described with reference to FIG. 5, the sampling devices may be commercially available analog switches.

By providing a phase differential between the signals on lines 32 and 34, the analog switches represented by the modulating devices preferably cause the signals 18 and 20 to be modulated at separate times from one another. Thus, as subsequently explained, where the destination and second source 14 and 16 are in close proximity to one another, feedback from the receiver to the transmitter, which would otherwise be introduced in prior bidirectional circuits in the configuration of FIG. 1, is eliminated. For example, any portion of signal 18 which is fed back externally from the receiver in destination 14 to the transmitter in second circuit 16 is present only when the first sampling device 26 is controlled to pass the signal 18 from the first source. Where the sampling controller 30 is operated to assure that the first and second sampling devices 36 and 38 do not simultaneously modulate the input signals thereto, presence of a signal 18 at the second source circuit 16 will provide an input signal to the second sampling device 38, but the signal will not be passed by the device 38. Thus, a feedback loop including the bidirectional circuit, the destination circuit and the second source circuit is interrupted to prevent the possibility of generation of any ringing or other interaction between the two signals 18 and 20. Similarly, when the input signal to the second sampling device 38 is modulated for transmission to the first source circuit 10, i.e., when the analog switch represented by the second sampling device is closed, the switch represented by the first sampling device 36 is open. The input signal at lines 20 is prevented from passing in a loop including the destination receiver and the second source.

For operation as described above the control signals preferably cause the sampling devices to have no overlap in the sample times thereof. However, it is possible to provide control signals to the sampling devices which in fact have some overlap, since finite rise and decay times of the circuits of the destination and the second source tend to delay the onset of ringing. By selecting the overlap to be less than a critical time dependent on the delay time, ringing will be prevented.

With respect to the frequency of the sampling signals provided to the first and second sampling devices, it is known that information contained in a periodic signal is retained when sampling occurs at a rate in excess of a frequency determined by the Nyquist criterion. That is, sampling at a rate in excess of twice the highest frequency component of a repetitive signal will maintain the information content of the signal. Where some degradation in signal quality is acceptable, another criterion may be provided to assure retention of the minimally acceptable amount of information. Accordngly, the modulating controller 30 preferably operates at a frequency determined in accordance with such a criterion, thus assuring that sufficient information remains in the signals after modulation.

Figure 4:
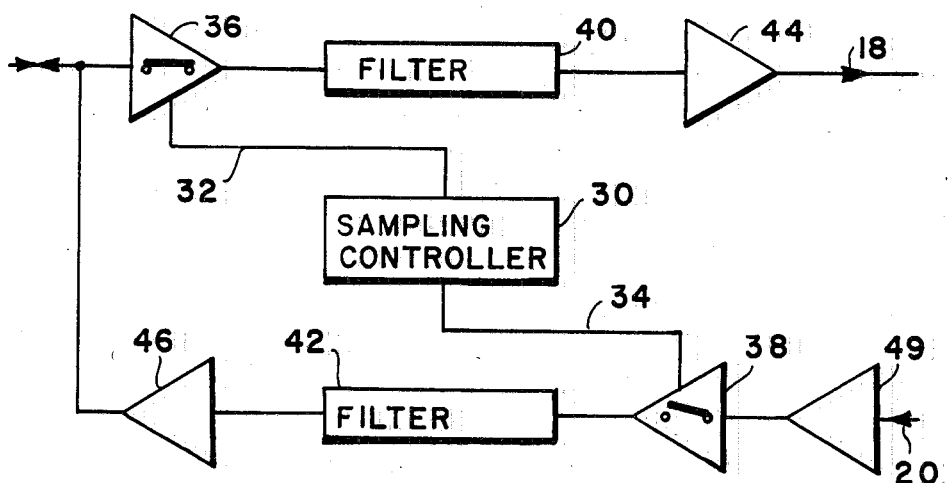
FIG. 4 shows a block diagram representation of the inventive structure.

Referring now to FIG. 4, the inventive bidirectional circuit is shown as a bidirectional amplifier. As shown therein, the sampling devices 36 and 38 provide the output signals to first and second filters 40 and 42. These filters, though optional, are provided for the purpose of filtering out any switching noise generated by the modulating procedure. Thus, where the modulating control signals are provided at a high frequency, the filters 40 and 42 may be of a low-pass type in order to remove the switching components from the signal and to permit the remaining components to be amplified by first and second amplifiers 44 and 46. Amplifiers 44 and 46 not only amplify the sample signals but further isolate the bidirectional amplifier modulating circuitry from the output circuits thereof.

As is apparent from the drawing, the output of amplifier 44 may be provided to a destination circuit previously described, which may be a public address system, an intercommunication system, a monitor or the like. The output of amplifier 46 is returned to the first source circuit.

Figure 5:
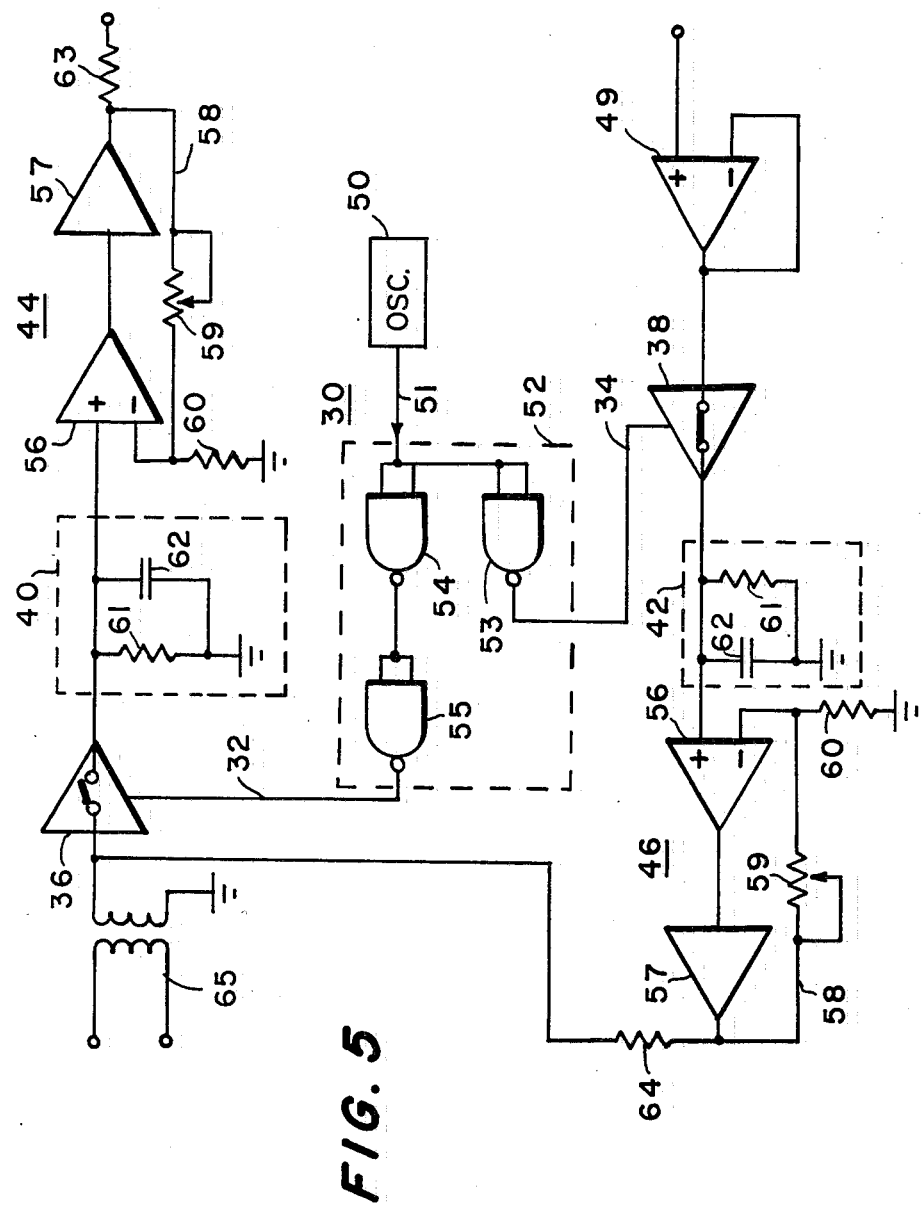
FIG. 5 shows a detailed representation of the inventive structure shown at FIG. 4.

Preferably, amplifiers 44 and 46 are provided with variable gain adjustments to permit wide ranging gain variation, as will be apparent in the circuit of FIG. 5. The gain controls may be individually set or may be ganged in a manner known in the art, and may further be manually or electronically controlled.

Additionally, there is provided an isolation amplifier 49 at the input to the second modulating device 38 in order to isolate the analog switch used therein from the second source 16. A similar isolation amplifier (not shown) may be provided at the input to the first modulating device 36 to isolate the analog switch therein from both the first source 10 and the second amplifier 46. Preferably, such isolation amplifiers are provided with unity gain and a high input impedance, although other parameters may be specified therefor. For example, while maintaining a high input impedance the isolation amplifier may include a nonunity gain in order to provide still further amplification by the inventive device.

Referring now to FIG. 5, the several various components illustrated in the block diagram of FIG. 4 are shown in particular detail to illustrate a preferred embodiment of the invention, although the invention may be realized in other forms.

The modulating controller 30 is preferably formed of an oscillator 50 of the type designated by CD4047AE, for example, preferably operating at 50 kHz to assure sufficiently rapid modulation to detect the frequencies of interest in the signals being modulated. The output of the oscillator is provided as a logic signal on line 51 to a logic circuit 52 utilized for providing the two control signals on lines 32 and 34. Logic circuit 52 includes a number of NAND gates, connected as inverters, to provide a phase differentiation between the signals on lines 32 and 34. Thus, a first NAND gate 53 inverts the logic levels provided on output line 51 by oscillator 50 and produces at its output the control signal provided on line 34 to the analog switch used as the second modulating device 38. A pair of NAND gates 54 and 55 are connected to provide no phase inversion but to provide isolation between the output of oscillator 50 and the control input terminal of a second analog switch used as the first sampling device 36. The analog switches used in devices 36 and 38 may be of the type HI-200, formed on a single chip, each controlled by the two oppositely phased gating signals.

Preferably, the gating control signals are 180° out of phase with one another, as provided by the simple logic arrangement of circuit 52. As has been previously described, however, other phasing arrangements may be utilized without departing from the scope of the invention. Thus, the control signals which overlap in the portions thereof controlling the analog switches to be open, may or may not overlap in the portions controlling the analog switches to close.

Amplifiers 44 and 46 are each provided as a cascade combination of amplifier pairs 56 and 57. Amplifier 56 may of the type commercially available under the designation SN72741, while amplifier 57 may be of the type commercially available under the designation LH000CN. In a feedback loop 58 provided around the amplifier pairs there is provided a potentiometer 59 for controlling the amplifier gain. A grounding resistor 60 is provided at the inverting input of amplifier 56, while the noninverting input receives the output of the analog switch through filters 40 and 42.

Filters 40 and 42 are seen to be low-pass filters comprised of parallel RC circuits formed by a resistor 61 and a capacitor 62, the resistor and capacitor combination being chosen to provide an RC time constant in accordance with the sampling frequency generated by oscillator 50. For the preferably operating frequency of 50 kHz, the resistor 61 is preferably 10 Kohm and capacitor 62 is preferably 0.01 microfarad.

Isolation amplifier 49 may be a unity gain connected amplifier of the type SN72741 having its noninverting input connected to receive the output of the second source circuit 16, and having its output fed back to the inverting input thereof.

The outputs of amplifiers 44 and 46 are provided through resistances 63 and 64 selected to provide an appropriate impedance level to the circuits connected thereto. A coupling transformer 65 is provided between the line pair 12, at the input of the first sampling device 36, and the first source circuit. The transformer provides impedance matching between the source circuit and the bidirectional amplifier of the present invention. However, such a transformer is optional and may be replaced by an appropriate impedance. Additionally as has been previously described, the input to isolation amplifier 49 may be connected to the output of amplifier 44 for operation with a transducer or similar device. Where such two port operation is required, the connection may be made through a 1 Kohm or larger resistor.

For the circuit shown in FIG. 5, utilizing the specific components described above, the following characteristics are advantageously provided. A signal bandpass from DC to 700 kHz is exhibited. The input and output impedance of the circuit may range from 7Ω to several megohms. Depending on line noise levels, the sign amplitude range for both input and output may range from a minimum of several microvolts to a maximum of ±15 volts. The gain for both incoming and outgoing signals may be set to values ranging from less than 1 to 200,000. Finally, maximum possible stability is provided independently of signal amplitude or frequency since the sampling control signals, and hence the outgoing signals at both ports, are always 180° out of phase.

There has thus been described a bidirectional circuit, including a bidirectional amplifier therein, operable for transmission of signals in two directions therethrough. The signals may be passed with or without amplification, and are passed without generation of any additional feedback between the input and output signals. The effects of such feedback or crosstalk are eliminated by appropriately modulating the signals passing in the two directions in such a manner as to break the feedback loop which may otherwise be completed externally to the bidirectional amplifier. The feedback loop is broken by providing a phase displacement between the samples obtained for the two signals.

While a specific preferred embodiment has been described in the foregoing specification, this embodiment is presented for purposes of illustration and description and is not intended to exhaust or limit the invention to the precise form thereof. Obvious modifications or variations are possible in light of the above teaching. The preferred embodiment was chosen and described to provide the best illustration of the principles of the invention and its practical application, thereby to enable one of ordinary skill in the art to utilize the invention in various embodiments and with various modifications as are suited to the particular use contemplated. It is intended that the scope of the invention be defined by the claims appended hereto.

I claim:

1. A bidirectional amplifier for passing first signals from a first source circuit to a destination circuit and second signals from a second source circuit to said first source circuit comprising:
    first switchable signal path means, connected between said first source circuit and said destination circuit, for passing either only said first signals while closed or no signal while open;
    second switchable signal path means, connected between said second source circuit and said first source circuit, for passing either only said second signals while closed or no signal while open; and
    switching signal generating means, connected to said first and second switchable signal path means, for causing alternately, at a frequency at least twice the highest frequency of said first and second signals, only either one of said switchable signal path means to be open and the other of said switchable signal path means to be closed, or the other of said switchable signal path means to be open and the one of said switchable signal path means to be closed.

2. A bidirectional amplifier as recited in claim 1 wherein said switching signal generating means comprises oscillating means for providing first and second periodic switching signals, in phase opposition with one another, to said first and second switchable signal path means.

3. A bidirectional amplifier as recited in claim 2 wherein said first and second switchable signal path means each comprises controllable analog switching means.

4. A bidirectional amplifier as recited in claim 2 wherein said first and second switchable signal path means comprise, respectively, first and second switchable gating means connected to, respectively, first and second amplifying means for providing first and second gains to said first and second signals from said first and second sources.

5. A bidirectional amplifier as recited in claim 4 wherein said first and second amplifying means each includes means for varying said gains provided to said first and second signals.

6. A bidirectional amplifier as recited in claim 4 further comprising first and second filter means, connected to said first and second signal paths, respectively, for reducing switching noise added to said first and second signals by said first and second switching signals, respectively.

7. A bidirectional amplifier as recited in claim 6 wherein said first and second filter means are respectively connected between said first and second switchable gating means and said first and second amplifying means.

8. A bidirectional amplifier as recited in claim 4 further comprising isolation buffer means connected to an input of at least of one of said first and second switchable gating means for isolating said at least one of said first and second switchable gating means from a corresponding at least one of said first and second source circuits.

9. A bidirectional amplifier as recited in claim 1 wherein said destination circuit and said second source circuit are a single circuit connected to an output of said first switchable signal path means and an input of said second switchable signal path means.

10. A bidirectional amplifier as recited in claim 9 wherein said first and second switchable signal path means comprise, respectively, first and second switchable gating means connected to, respectively, first and second amplifying means for providing first and second gains to said first and second signals from said first and second sources, and impedance means connected between an output of said second amplifying means and an input of said first switchable gating means.

11. A bidirectional circuit for conveying a first signal from a first source circuit to a destination circuit and a second signal from a second source circuit to said first source circuit, comprising:

in a first signal path:
first amplifying means for receiving said first signal and providing a first gain thereto; and
first controlled gating means, responsive to a first control signal, for controllably blocking passage of said first signal through said first signal path;

in a second signal path:
second amplifying means for receiving said second signal and providing a second gain thereto; and
second controlled gating means, responsive to a second control signal, for controllably blocking passage of said second signal through said second signal path; and control means for providing, alternately at a frequency at least twice the highest frequency of said first and second signals, said first and second control signals at phases substantially 180° apart from each other to said first and second controlled gating means, respectively, for alternately permitting only passage through said first signal path while said second signal path is blocked or passage through said second signal path while said first signal path is blocked.

12. A bidirectional circuit as recited in claim 11 wherein the duration of said first control signal is approximately equal to the duration of said second control signal.

13. A bidirectional circuit as recited in claim 12 wherein said first and second signal paths include first and second feedback control means for controllably varying the gains of said first and second amplifying means.

14. A bidirectional circuit as recited in claim 13 wherein said first source circuit comprises a transmission line connected to a telephone network.

15. A bidirectional circuit as recited in claim 14 wherein said second source circuit comprises a transmitter and said destination circuit comprises a receiver of a device connected to the telephone network.

16. A bidirectional circuit as recited in claim 12 wherein said destination circuit and said second source circuit form a single circuit, said bidirectional circuit being operable for conveying said first and second signals from said first and second source circuits to said second and first source circuits, respectively.

* * * * *